(12) United States Patent
Qu et al.

(10) Patent No.: US 12,293,300 B2
(45) Date of Patent: May 6, 2025

(54) METHOD AND APPARATUS FOR TRAINING SEMANTIC RETRIEVAL NETWORK, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Yingqi Qu, Beijing (CN); Yuchen Ding, Beijing (CN); Jing Liu, Beijing (CN); Hua Wu, Beijing (CN); Haifeng Wang, Beijing (CN)

(73) Assignees: BEIJING BAIDU NETCOM SCIENCE TECHNOLOGY CO., LTD., Beijing (CN); CO., LTD., Beijing (CN)

( * ) Notice: Subject to any disclaimer, the term of this patent is extended or adjusted under 35 U.S.C. 154(b) by 308 days.

(21) Appl. No.: 17/930,221

(22) Filed: Sep. 7, 2022

(65) Prior Publication Data
US 2023/0004819 A1    Jan. 5, 2023

(30) Foreign Application Priority Data

Sep. 30, 2021  (CN) .......................... 202111168520.X (51) Int. Cl.
*G06N 5/01*      (2023.01)
*G06F 16/2457*   (2019.01)
*G06F 40/30*     (2020.01)

(52) U.S. Cl.
CPC ......... *G06N 5/01* (2023.01); *G06F 16/24578* (2019.01); *G06F 40/30* (2020.01)

(58) Field of Classification Search
CPC .. G06N 5/01; G06N 3/04; G06N 3/09; G06N 3/045; G06N 3/08; G06F 16/24578;
(Continued)

(56) References Cited

U.S. PATENT DOCUMENTS 11,514,125 B1 *  11/2022  Momma ................. G06N 20/20
2010/0161601 A1 *  6/2010  Gruber .................. G06F 16/367
                                                    707/E17.014
(Continued)

FOREIGN PATENT DOCUMENTS

CN    106339383 A    1/2017
CN    109740152 A    5/2019
(Continued)

OTHER PUBLICATIONS

Office Action issued for Chinese patent application No. 202111168520.X, mailed Jun. 29, 2023 (27 pages).

*Primary Examiner* — Darioush Agahi
(74) *Attorney, Agent, or Firm* — Osha Bergman Watanabe & Burton LLP (57) ABSTRACT

The disclosure provides a method for training a semantic retrieval network, an electronic device and a storage medium. The method includes: obtaining a training sample including a search term and n candidate files corresponding to the search term, where n is an integer greater than 1; inputting the training sample into the ranking model, to obtain n first correlation degrees output by the ranking model, in which each first correlation degree represents a correlation between a candidate document and the search term; inputting the training sample into the semantic retrieval model, to obtain n second correlation degrees output by the semantic retrieval model, wherein each second correlation degree represents a correlation between a candidate document and the search term; and training the semantic retrieval model and the ranking model jointly based on the n first correlation degrees and the n second correlation degrees.

12 Claims, 4 Drawing Sheets

(58) Field of Classification Search
CPC .... G06F 40/30; G06F 16/3329; G06F 16/953; G06F 16/3347; G06F 18/214; G06F 18/22; Y02D 10/00
See application file for complete search history.

(56) References Cited

U.S. PATENT DOCUMENTS

| | | | |
|---|---|---|---|
| 2015/0278341 A1* | 10/2015 | Shen | G06F 16/9538 707/730 |
| 2019/0057159 A1* | 2/2019 | Li | G06F 16/3325 |
| 2020/0327373 A1* | 10/2020 | Tecuci | G06F 40/284 |
| 2021/0224286 A1* | 7/2021 | Wu | G06F 16/24578 |
| 2022/0318633 A1* | 10/2022 | Kim | G06N 3/045 |
| 2024/0119080 A1* | 4/2024 | Zhang | G06F 16/3329 |
| 2024/0259072 A1* | 8/2024 | Liu | H04B 7/0639 |

FOREIGN PATENT DOCUMENTS

| | | |
|---|---|---|
| CN | 111026849 A | 4/2020 |
| CN | 111832290 A | 10/2020 |
| CN | 112100529 A | 12/2020 |
| CN | 112148895 A | 12/2020 |
| CN | 112560501 A | 3/2021 |
| CN | 112988969 A | 6/2021 |
| CN | 113076395 A | 7/2021 |
| WO | 2021057046 A1 | 4/2021 |

* cited by examiner

METHOD AND APPARATUS FOR TRAINING SEMANTIC RETRIEVAL NETWORK, ELECTRONIC DEVICE AND STORAGE MEDIUM

CROSS REFERENCE TO RELATED APPLICATIONS

This application is based on and claims priority to Chinese patent application Serial No. 202111168520. X filed on Sep. 30, 2021, the entire contents of which are incorporated herein by reference.

TECHNICAL FIELD

The disclosure relates to a field of data processing, especially a field of artificial intelligence such as natural language processing and deep learning, and in particular to a method for training a semantic retrieval network, an apparatus for training a semantic retrieval network, an electronic device and a storage medium.

BACKGROUND

In the related art, an information retrieval system generally has a recalling stage and a ranking stage. In the recalling stage, K candidates are obtained from a large-scale candidate database based on a semantic model. In the ranking stage, a more complex model is used to resort the K candidates, and return a sorted answer list at last. The semantic retrieval model and the ranking model are interdependent. The ranking model needs to adapt to a distribution of candidates produced by the semantic retrieval model, and the semantic retrieval model needs to continuously learn from the ranking model to enhance its own ability.

However, the retrieval system in the related art has low efficiency for training the semantic retrieval model and the ranking model, and a poor training effect.

SUMMARY

Embodiments of the disclosure provide a method for training a semantic retrieval network, an electronic device and a storage medium.

According to a first aspect of the disclosure, a method for training a semantic retrieval network is provided. The semantic retrieval network includes a semantic retrieval model and a ranking model, and the method includes: obtaining a training sample comprising a search term and n candidate documents corresponding to the search term, where n is an integer greater than 1; inputting the training sample into the ranking model, to obtain n first correlation degrees output by the ranking model, wherein each first correlation degree represents a correlation between a candidate document and the search term; inputting the training sample into the semantic retrieval model, to obtain n second correlation degrees output by the semantic retrieval model, wherein each second correlation degree represents a correlation between a candidate document and the search term; and training the semantic retrieval model and the ranking model jointly based on the n first correlation degrees and the n second correlation degrees.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the method according to the first aspect of the disclosure is implemented.

According to a third aspect of the disclosure, a non-transitory computer-readable storage medium having computer instructions stored thereon is provided. The computer instructions are configured to cause a computer to implement the method according to the first aspect of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

In the technical solution of the disclosure, the acquisition, storage and application of the personal information of the user involved are in compliance with relevant laws and regulations, and do not violate public order and good customs. The involved personal information of the user is obtained, stored and applied with the user's consent.

In the related art, an information retrieval system generally has a recalling (also referred to as candidate generation) stage and a ranking stage. In the recalling stage, K candidates are obtained from a large-scale candidate database based on a semantic retrieval model. In the ranking stage, a more complex model is used to resort the K candidates, and return a sorted answer list at last. The semantic retrieval model and the ranking model are interdependent. The ranking model needs to adapt to a distribution of candidates produced by the semantic retrieval model, and the semantic retrieval model needs to continuously learn from the ranking model to enhance its own ability.

However, the retrieval system in the related art usually trains the semantic retrieval model and the ranking model independently. Due to the inseparable relationship between the two models, multiple iterations are required in the training process, so that the training efficiency is low, the training cost is high, and the effect after training is poor.

Based on the above problems, the disclosure provides a method for training a semantic retrieval network, an apparatus for training a semantic retrieval network, an electronic device and a storage medium. In order to facilitate the understanding of the technical solution, the method for training a semantic retrieval network according to the disclosure will be introduced firstly.

Figure 1:
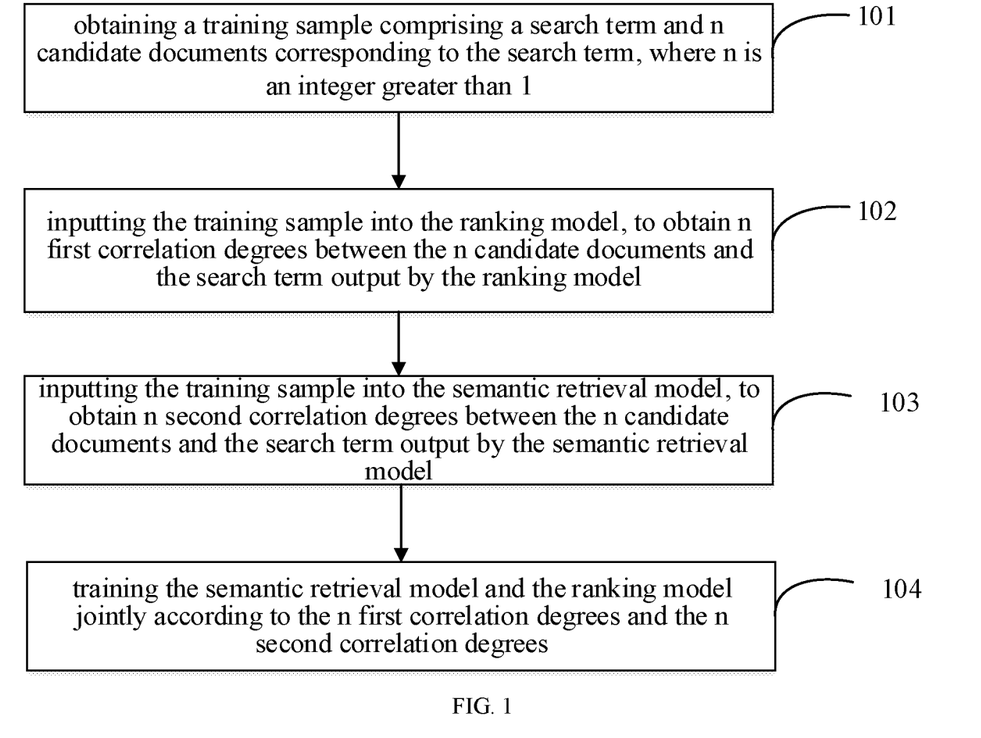
FIG. 1 is a flowchart of a method for training a semantic retrieval network according to an embodiment of the disclosure.

FIG. 1 is a flowchart of a method for training a semantic retrieval network according to an embodiment of the disclosure. It should be noted that, in the embodiments of the disclosure, the semantic retrieval network is a neural network that can be used to find information such as documents or fragments of text related to a search term in a massive amount of text based on the search term, and can be used in the information retrieval system to realize a retrieval function.

In the embodiments of the disclosure, the semantic retrieval network includes a semantic retrieval model for the recalling stage and a ranking model for the ranking stage. It should be noted that the method for training a semantic retrieval network in the embodiments of the disclosure can be applied to the apparatus for training a semantic retrieval network in the embodiments of the disclosure, and the apparatus can be configured in an electronic device. As illustrated in FIG. 1, the method may include the following steps.

In step 101, a training sample including a search term and n candidate documents corresponding to the search term are obtained, where n is an integer greater than 1.

In the embodiments of the disclosure, the search term in the training sample refers to a keyword used by a user for retrieval, and the candidate documents corresponding to the search term refer to the documents related to the search term. The candidate documents are related to specific application fields. For example, in a web page search engine, the candidate documents may be web pages related to the search term crawled by a search engine based on the search term. In a question and answer platform, the candidate documents may be question and answer information related to the search term in a question and answer knowledge base. In a book search engine, the candidate documents may be a book text related to the search term in a database.

In addition, in the training sample, each search term corresponds to n candidate documents and the n candidate documents may include both positive and negative example candidate documents. The positive example candidate document refers to a candidate document completely related to the search term, and the negative example candidate document refers to a candidate document not completely related to the search term.

For example, a retrieval log of the information retrieval system within a period of time can be obtained, keywords in the retrieval log are used as the search terms in the training sample, and the documents in a retrieval result corresponding to each keyword in the retrieval log are used as candidate documents of the keyword. In the retrieval log, according to the retrieval result of each search term, the document clicked by the user is labeled as a positive example candidate document, and the document that is not clicked by the user in the retrieval result is regarded as a negative example candidate document.

For example, the obtained search term can be input into an initial semantic retrieval model, and the documents and correlation scores related to the search term are retrieved from a document library through the initial semantic retrieval model, and the retrieved related documents are ranked according to the corresponding correlation scores in a descending order. The ranked first document or the first few documents are regarded as positive example candidate documents, and the remaining documents in the first N documents are regarded as negative example candidate documents. It should be noted that the initial semantic retrieval model refers to a semantic retrieval model trained by an existing training mode.

In step 102, the training sample is input into the ranking model, to obtain n first correlation degrees output by the ranking model. Each first correlation degree represents a correlation between a candidate document and the search term.

In the related art, the semantic retrieval model for the recalling stage is usually trained by means of in-batch negative sampling, while the ranking model is trained by a single-point-based training method. The in-batch negative sampling means that, for a certain group of samples in the same batch, positive samples in the remaining samples other than the group of samples in the batch are regarded as negative samples for the group of samples. The single-point-based method means that an input space sample is a feature vector composed of a single document and a search term, and an output space is a correlation degree between the single document and the search term. Due to different training methods, the two models have different training data construction methods, different input forms, and different output scoring distributions, thus joint training cannot be performed.

In order to ensure the joint training of the semantic retrieval model and the ranking model, it is necessary to unify the data input form and data construction method of the semantic retrieval model and the ranking model. As an implementation, in some embodiments of the disclosure, a training target of the ranking model may be in the form of listwise.

In some embodiments of the disclosure, each training sample includes a search term and n candidate documents corresponding to the search term. The training sample is input into the ranking model, to obtain n first correlation degrees output by the ranking model. It can be understood that for each training samples, the training sample is input into the ranking model, and through model calculation, the first correlation degree between each candidate document and the search term in the training sample is obtained.

For example, if a training sample in the training samples is (search term A, candidate document 1, candidate document 2, candidate document 3, candidate document 4), then after inputting the training sample into the ranking model, four first correlation degrees output by the ranking model can be obtained, i.e., the first correlation degree a, the first correlation degree b, the first correlation degree c, and the first correlation degree d. The first correlation degree a is used to indicate a correlation between the candidate document 1 and the search term A, the first correlation degree b is used to indicate a correlation between the candidate document 2 and the search term A, the first correlation degree c is used to represent a correlation between the candidate document 3 and the search term A, and the first correlation degree d is used to represent a correlation between the candidate document 4 and the search term A.

It should be noted that the ranking model adopted in some embodiments of the disclosure may be an untrained ranking model, or an initial ranking model that has been trained using an existing training method, which is not limited.

In some embodiments of the disclosure, the ranking model may be an interactive model, or may be other models used in the ranking stage, which is not limited in the disclosure.

In step 103, the training sample is input into the semantic retrieval model, to obtain n second correlation degrees output by the semantic retrieval model are obtained. Each second correlation degree represents a correlation between a candidate document and the search term.

For each training sample, the training sample is input into the semantic retrieval model, and through model calculation, the second correlation degree between each candidate document and the search term in the training sample is obtained. The corresponding relationship of the second correlation degree is consistent with the corresponding relationship of the first correlation degree in step 102.

In some embodiments of the disclosure, the semantic retrieval model may be a dual-tower retrieval model, or may be other models used in the recalling stage, which is not limited in this disclosure.

In step 104, the semantic retrieval model and the ranking model are trained jointly according to the n first correlation degrees and the n second correlation degrees.

That is, a loss value can be calculated according to the first correlation degrees and the second correlation degrees, and the semantic retrieval model and the ranking model can be jointly trained according to the loss value.

It can be understood that the correlation between the positive example candidate document and the search term in the training sample is greater than the correlation between the negative example candidate document and the search term. As an implementation, according to each difference between (a) the first correlation degree between the positive example candidate document and the search term, and (b) the first correlation degree between the negative example candidate document and the search term, differences between the n first correlations and differences between the n second correlation degrees, the loss value is calculated. According to the loss value, the semantic retrieval model and the ranking model are jointly trained.

For example, the loss value of the ranking model is calculated according to each difference between (a) the first correlation degrees between the positive example candidate document and the search term, and (b) the first correlation degrees between the negative example candidate document and the search term. The loss value of the semantic retrieval model is calculated according to each difference between (a) the second correlation degree between the positive example candidate document and the search term, and (b) the second correlation degree between the negative example candidate document and the search term. Weighted calculation is performed on the loss value of the ranking model and the loss value of the semantic retrieval model to obtain a joint loss value. The semantic retrieval model and the ranking model are jointly trained according to the joint loss value.

According to the method for training a semantic retrieval network of the disclosure, the training sample is input into the ranking model and the semantic retrieval model respectively, the first correlation degrees output by the ranking model and the second correlation degrees output by the semantic retrieval model are obtained. The semantic retrieval model and the ranking model are jointly trained according to the first correlation degrees and the second correlation degrees, which can not only improve the efficiency of model training, but also improve the effect after training and save training costs.

To further introduce the implementation of the joint training process, the disclosure provides another embodiment.

Figure 2:
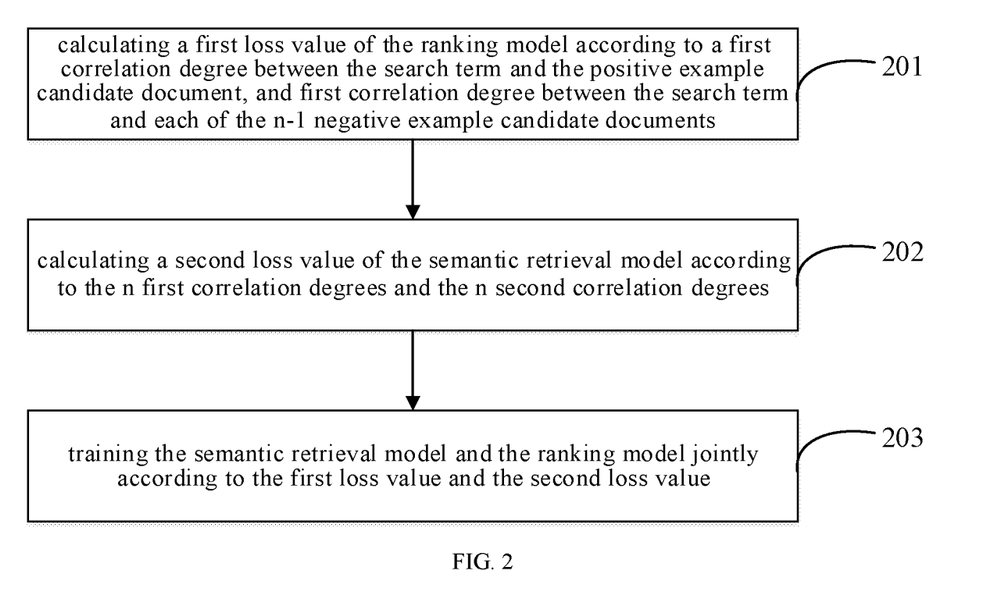
FIG. 2 is a flowchart of joint training of a semantic retrieval model and a ranking model according to an embodiment of the disclosure.

FIG. 2 is a flowchart of joint training of a semantic retrieval model and a ranking model according to an embodiment of the disclosure. In order to make the model better learn the difference between the positive example candidate document and the negative example candidate document, it is set that the correlation degree between the positive example candidate document and the search term output by the model is greater than the correlation degree between the negative example candidate document and the search term. In some embodiments of the disclosure, the n candidate documents corresponding to the search term in the training sample include one positive example candidate document and n−1 negative example candidate documents. As illustrated in FIG. 2, on the basis of the above embodiments, the implementation process of jointly training the semantic retrieval model and the ranking model according to the n first correlation degrees and the n second correlation degrees may include the following steps.

In step 201, a first loss value of the ranking model is calculated according to the first correlation degree between the search term and the positive example candidate document, and the first correlation degree between the search term and each negative example candidate document.

It can be understood that, for each training sample, an expected result is that the correlation degree between the positive example candidate document and the search term output by the model is greater than the correlation degree between the negative example candidate document and the search term.

In order to make sure that the first correlation degree between the positive example candidate document and the search term output by the ranking model is greater than the first correlation degree between the negative example candidate document and the search term in the joint training stage, the first loss value of the ranking model can be calculated according to the first correlation degree between the search term and the positive example candidate document and the first correlation degree between the search term and each of the negative example candidate documents.

For example, the first loss value of the ranking model is calculated according to formula (1):

$$L_{sup} = -\frac{1}{N}\Sigma_{q\in Q,p^+}\log\frac{e^{s_{ce}(q,p^+)}}{e^{s_{ce}(q,p^+)} + \Sigma_p - e^{s_{ce}(q,p^-)}} \quad (1)$$

$L_{sup}$ is the first loss value of the ranking model, N is the number of samples, $s_{ce}(q, p^+)$ is the first correlation degree between the search term and the positive example candidate document output by the ranking model, $s_{ce}(q, p^-)$ is the first correlation degree between the search term and the negative example candidate document output by the ranking model, Q refers to the training sample, and q refers to the search term.

In step 202, a second loss value of the semantic retrieval model is calculated according to the n first correlation degrees and the n second correlation degrees.

It can be understood that the semantic retrieval model and the ranking model are interdependent. The ranking model needs to adapt to a candidate distribution generated by the semantic retrieval model, and the semantic retrieval model needs to continuously learn from the ranking model to enhance its own capabilities. In some embodiments of the disclosure, a soft label may be used to correlate the correlation scores of the two models, to avoid wrong accumulation of labels for low-confidence data. That is, the first correlation degree output by the ranking model is used as the soft label of the second correlation degree output by the semantic retrieval model, so that the second loss value of the semantic retrieval model is calculated according to the difference of the first correlation degree and the second correlation degree between the corresponding candidate document and the search term.

For example, the second loss value is obtained by performing Kullback-Leibler (KL) dispersion loss calculation according to the n first correlation degrees and the n second correlation degrees. Its implementation can include: for each training sample, normalizing the first correlation degree between each candidate document and the search term output by the ranking model, and simultaneously normalizing the second correlation degree between each candidate document and the search term output by the semantic retrieval model; and performing the KL dispersion loss calculation according to the normalized correlation degrees. The calculation method of the normalization processing can be implemented according to formula (2) and formula (3), and the KL dispersion loss calculation can be expressed by formula (4):

$$\tilde{s}_{ce}(q, p) = \frac{e^{s_{ce}(q,p)}}{\Sigma_{p' \in P_q} e^{s_{ce}(q,p')}} \quad (2)$$

$$\tilde{s}_{de}(q, p) = \frac{e^{s_{de}(q,p)}}{\Sigma_{p' \in P_q} e^{s_{de}(q,p')}} \quad (3)$$

$s_{ce}(q, p)$ is the first correlation degree between the candidate document p and the search term q output by the ranking model, $s_{de}(q, p)$ is the second correlation degree between the candidate document p and the search term q output by the semantic retrieval model, $\tilde{s}_{ce}(q, p)$ is the normalized value of the first correlation degree between the candidate document p and the search term q, $\tilde{s}_{de}(q, p)$ is the normalized value of the second correlation degree between the candidate document p and the search term q, $P_q$ refers to the n candidate samples corresponding to q.

$$L_{KL} = \Sigma_{q \in Q, p \in P_q} \tilde{s}_{de}(q, p) \cdot \log \frac{\tilde{s}_{de}(q, p)}{\tilde{s}_{ce}(q, p)} \quad (4)$$

$\tilde{s}_{ce}(q, p)$ is the normalized value of the first correlation degree between the candidate document p and the search term q, $\tilde{s}_{de}(q, p)$ is the normalized value of the second correlation degree between the candidate document p and the search term q, $P_q$ refers to the n candidate samples corresponding to the search term q, and Q refers to the training sample.

In step 203, the semantic retrieval model and the ranking model are trained jointly according to the first loss value and the second loss value.

It can be understood that the first loss value is used to represent a difference between the first correlation degree output by the ranking model and a real sample value, and the second loss value is used to represent a difference between the second correlation degree output by the semantic retrieval model and the first correlation degree output by the ranking model. In this way, according to the first loss value and the second loss value, the semantic retrieval model and the ranking model can be jointly trained. On the one hand, supervised learning can be performed on the ranking model, so that the ability of the ranking model can be continuously improved, and on the other hand, it is also possible to further narrow the distribution between the ranking model and the semantic retrieval model. That is, not only can the semantic retrieval model learn the ability of the ranking model, but also the ranking model can be adapted to the distribution of the semantic retrieval model, thereby improving the efficiency of model training and the effect of model training.

As an implementation, the joint loss value can be calculated according to the first loss value and the second loss value. The semantic retrieval model and the ranking model can be jointly trained according to the joint loss value. The joint loss value can be calculated by summing the first loss value and the second loss value, or the first loss value and the second loss value can be weighted and summed to obtain the joint loss value, and other methods may also be used to calculate the joint loss value according to the actual application, which is not limited in the disclosure.

According to the method for training a semantic retrieval network of the embodiments of the disclosure, the first loss value of the ranking model is calculated according to the first correlation degree between the search term and the positive example candidate document, and the first correlation degree between the search term and each negative example candidate document. The second loss value of the semantic retrieval model is calculated according to the first correlation degrees and the second correlation degrees, so that the semantic retrieval model and the ranking model can be jointly trained according to the first loss value and the second loss value. On the one hand, the technical solution can carry out supervised learning of the ranking model, so that the ability of the ranking model can be continuously improved, and on the other hand, it can further narrow the distribution between the ranking model and the semantic retrieval model. That is, not only can the semantic retrieval model learn the ability of the ranking model, but also the ranking model can be adapted to the distribution of the semantic retrieval model, thereby improving the efficiency of model training and the effect of model training.

The disclosure provides another embodiment for the acquisition of the training sample.

Figure 3:
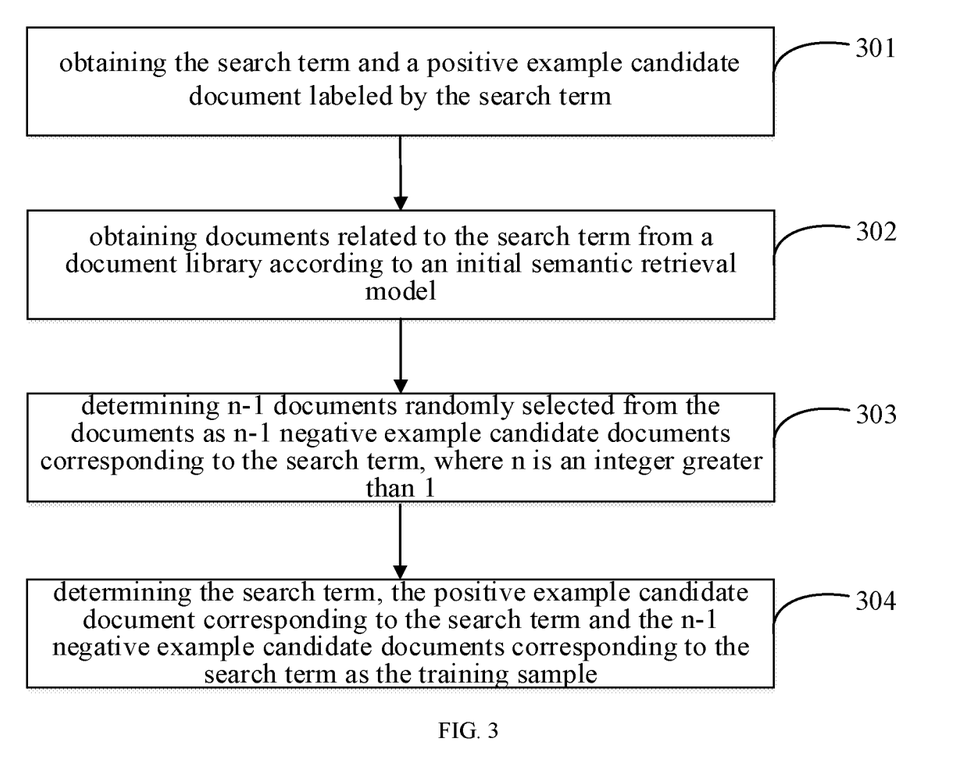
FIG. 3 is a flowchart of obtaining a training sample according to an embodiment of the disclosure.

FIG. 3 is a flowchart of obtaining a training sample according to an embodiment of the disclosure. As illustrated in FIG. 3, the way to obtain training samples may include the following steps.

In step 301, the search term and the positive example candidate document labeled by the search term are obtained.

In some embodiments of the disclosure, in order to enable the model to learn that the correlation degree between the positive example candidate document and the search term is greater than the correlation degree between the negative example candidate document and the search term, n candidate documents in each training sample can include one positive example candidate document and n−1 negative example candidate documents. The positive example candidate documents are usually associated with the search term in the form of annotations.

In the embodiment of the disclosure, the search term in the training sample refers to the keyword used by the user for retrieval, which can be obtained in the retrieval log of the information retrieval system, or in a constructed search term database, and other methods may also be used to obtain the search term according to actual application scenarios. The positive example candidate document refers to the document having the highest correlation with the search term, generally, it can be manually annotated to correspond to the search term, or it can be annotated through other methods.

In step 302, documents related to the search term are obtained from a document library according to the initial semantic retrieval model.

It should be noted that, in some embodiments of the disclosure, the initial semantic retrieval model refers to a semantic retrieval model trained by an existing training method. It can be understood that the initial semantic retrieval model has a capability of retrieving related documents in the document library according to the search term, so the documents related to the search term can be obtained from the document library through the initial semantic retrieval model.

For example, the search terms obtained in step 301 can be input into the initial semantic retrieval model respectively, and the related documents corresponding to each search term are output through calculation of the initial semantic retrieval model, and the output related documents are ranked according to the correlation in a descending order. In order to reduce the amount of computation, an upper limit N of the number of documents related to the search term can be set for each search term, so that the initial semantic retrieval model outputs the top N related documents related to the search term.

In step 303, in the related documents, n−1 documents are randomly selected as negative example candidate documents corresponding to the search term, where n is an integer greater than 1.

It can be understood that the negative example candidate documents are documents related to the search term, so n−1 documents can be selected from the obtained related documents as the negative example candidate documents corresponding to the search term.

In order to improve the training effect of the model, in the embodiment of the disclosure, for each search term, n−1 documents are selected by random sampling from the related documents as the negative example candidate documents of the search term.

In step 304, the search term, and the positive and negative example candidate documents corresponding to the search term are determined as the training sample.

According to the method for training a semantic retrieval network according to the embodiment of the disclosure, each training sample includes a search term, and candidate documents corresponding to the search term, and the candidate documents include one positive example candidate document and multiple negative example candidate documents, thus a unified data structure is constructed for the joint training of the semantic retrieval model and the ranking model, which provides a data basis for the joint training.

Since the acquisition cost of the labeled data is high, in order to further reduce the training cost, the disclosure provides another embodiment for this problem.

Figure 4:
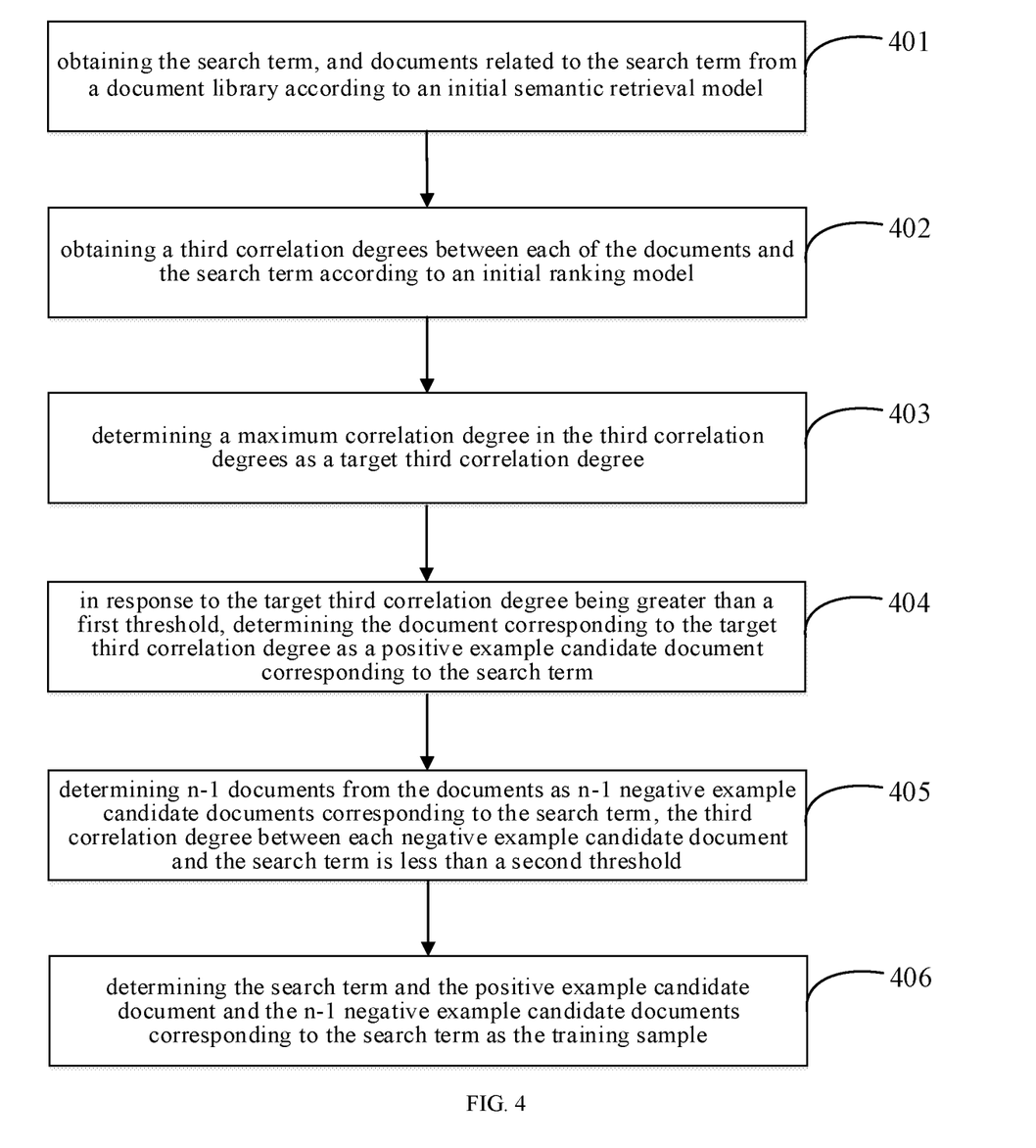
FIG. 4 is another flowchart of obtaining a training sample according to an embodiment of the disclosure.

FIG. 4 is another flowchart of obtaining a training sample according to an embodiment of the disclosure. As illustrated in FIG. 4, the mode of obtaining the training sample can include the following steps.

In step 401, the search term is obtained, and the documents related to the search term are obtained from the document library according to the initial semantic retrieval model.

In the embodiment of the disclosure, the search term in the training sample refers to the keyword used by the user for retrieval, which can be obtained in the retrieval log of the information retrieval system, or in the constructed search term database, or obtained through other methods according to actual application scenes.

For example, the obtained search terms can be input into the initial semantic retrieval model respectively, and through the calculation of the initial semantic retrieval model, the related documents corresponding to each search term and the correlation degree between each related document and the search term are output, and the output related documents are sorted in a descending order according to the correlation. In order to reduce the amount of calculation, for each search term, the upper limit N of the number of related documents for the search term can be set, such as N=1000, so that the first 1000 related documents related to the search term output by the initial semantic retrieval model can be obtained.

In step 402, a third correlation degree between each document and the search term is obtained according to the initial ranking model.

It should be noted that, in some embodiments of the disclosure, the initial ranking model refers to a ranking model trained by an existing training method. It can be understood that the ranking model has an ability to calculate the correlation degree between each related document and the search term according to the search term, so the third correlation degree between each document and the search term can be calculated through the initial ranking model.

For example, in order to reduce the computing cost, a part of related documents may be selected and input to the initial ranking model to calculate the third correlation degrees. The implementation method can be as follows: sorting the related documents according to the corresponding correlation degree with respect to the search term, where the correlation degree refers to the correlation degree output by the initial semantic retrieval model, and the larger the correlation degree between the document and the search term, the prior the document is arranged in the ranking list. According to the ranking, the first 50 documents are selected and input to the initial ranking model, and the third correlation degree between each document in the 50 documents and the search term is obtained.

In step 403, a maximum correlation degree in the third correlation degrees is determined as a target third correlation degree.

In step 404, in response to the target third correlation degree being greater than a first threshold, the document corresponding to the target third correlation degree is determined as a positive example candidate document corresponding to the search term.

In order to reduce the cost of acquiring the labeled data, the embodiment of the disclosure may determine the positive example candidate document according to the third correlation degrees output by the initial ranking model. At the same time, in order to ensure a quality of the positive example candidate document, the first threshold can be preset, and only when the target third correlation degree is greater than the first threshold, the document corresponding to the target third correlation degree can be determined as the positive example candidate document corresponding to the search term.

In step 405, n−1 documents are determined from the related documents as n−1 negative example candidate documents corresponding to the search term, the third correlation degree between each of the n−1 documents and the search term is less than a second threshold.

It can be understood that, in order to reflect the difference between the positive example candidate document and the negative example candidate document, and improve the effect of model training, in the embodiments of the disclosure, a second threshold is determined as a standard for determining the negative example candidate documents. Generally, the second threshold is smaller than the first threshold.

For example, the related documents obtained in step 401 are sorted according to the correlation degrees with the search term, and the correlation degree refers to the correlation degree output by the initial semantic retrieval model. The larger the correlation degree between the document and the search term, the prior the document is arranged in the ranking list. According to the ranking, the correlation degree between each document and the search term is compared with the second threshold from the front to the back, until the correlation degree between a document and the search term is found to be smaller than the second threshold, the document and all documents that are ranked after the file are determined as target selected documents. In the target selected documents, n−1 documents are selected from front to back as the negative example candidate documents of the search term according to the ranking.

For example, if the number of documents in the target selected documents is less than n−1, other documents can be randomly selected (for example, the number of the target selected documents is 50, while n=151, then the remaining 100 documents can be randomly selected) from the related documents that are not input to the initial ranking model. For example, if there are 1000 related documents output by the initial semantic retrieval model, the first 50 documents are input into the initial ranking model according to the order of correlation degrees, and the other documents can be randomly selected from the remaining 950 documents.

In step 406, the search term and the positive example candidate document and the n−1 negative example candidate documents corresponding to the search term are determined as the training sample.

It can be understood that the method of obtaining the training sample in the embodiments of the disclosure can be applied to unlabeled data, so that unsupervised training for the semantic retrieval model and the ranking model can be realized, and the training cost can be reduced.

In addition, in practical applications, the method of obtaining the training sample in the embodiments of the disclosure can also be combined with the method of obtaining the training sample in the above-mentioned embodiments, that is, the training sample may include both training sample obtained from labeled data and training sample obtained from unlabeled data. In this way, the training sample obtained through unlabeled data can be used as a supplement to the training sample obtained through labeled data to achieve data enhancement, and the training sample is constructed as weakly-supervised training data, thereby further improving the effect of model training.

According to the method for training a semantic retrieval network of the embodiments of the disclosure, based on the initial semantic retrieval model and the initial ranking model, it is possible to obtain the training sample according to the unlabeled data. That is, unsupervised joint training for the semantic retrieval model and the ranking model can be implemented, which can further reduce the training cost and solve the current problem of difficulty in obtaining the labeled data. In addition, the training sample can also be obtained from the unlabeled data for data enhancement, and the training sample obtained from the labeled data can be mixed with the training sample obtained from the unlabeled data as the training sample for joint training. In this way, the training data can be expanded to a greater extent and the training effect of the model can be improved.

In order to realize the above embodiments, the disclosure provides an apparatus for training a semantic retrieval network.

Figure 5:
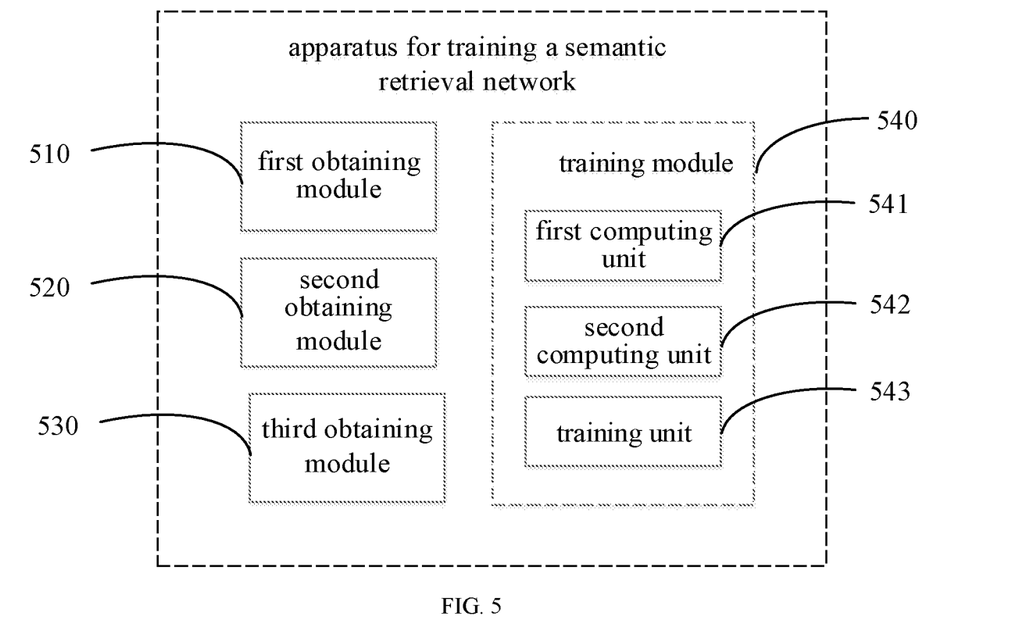
FIG. 5 is a block diagram of an apparatus for training a semantic retrieval network according to an embodiment of the disclosure.

FIG. 5 is a block diagram of an apparatus for training a semantic retrieval network according to an embodiment of the disclosure. As illustrated in FIG. 5, the apparatus may include: a first obtaining module 510, a second obtaining module 520, a third obtaining module 530 and a training module 540.

The first obtaining module 510 is configured to obtain a training sample comprising a search term and n candidate documents corresponding to the search term, where n is an integer greater than 1.

The second obtaining module 520 is configured to input the training sample into the ranking model, to obtain n first correlation degrees output by the ranking model, wherein each first correlation degree represents a correlation between a candidate document and the search term.

The third obtaining module 530 is configured to input the training sample into the semantic retrieval model, to obtain n second correlation degrees output by the semantic retrieval model, wherein each second correlation degree represents a correlation between a candidate document and the search term.

The training module 540 is configured to train the semantic retrieval model and the ranking model jointly based on the n first correlation degrees and the n second correlation degrees.

In some embodiments of the disclosure, the n candidate documents comprise a positive example candidate document and n−1 negative example candidate documents. The training module 540 includes: a first calculating unit 541, a second calculating unit 542 and a training unit 543.

The first calculating unit 541 is configured to calculate a first loss value of the ranking model based on the first correlation degree between the search term and the positive example candidate document, and the first correlation degree between the search term and each negative example candidate document.

The second calculating unit 542 is configured to calculate a second loss value of the semantic retrieval model based on the n first correlation degrees and the n second correlation degrees.

The training unit 543 is configured to train the semantic retrieval model and the ranking model jointly based on the first loss value and the second loss value.

In some embodiments of the disclosure, the training unit 543 is further configured to: calculate a joint loss value based on the first loss value and the second loss value; and train the semantic retrieval model and the ranking model jointly according to the joint loss value.

In some embodiments of the disclosure, the second calculating unit 541 is further configured to: obtain the second loss value by performing Kullback-Leibler (KL) dispersion loss calculation based on the n first correlation degrees and the n second correlation degrees.

In some embodiments of the disclosure, the first obtaining module 510 is further configured to: obtain the search term and a positive example candidate document labeled by the search term; obtain documents related to the search term from a document library based on an initial semantic retrieval model; select n−1 documents randomly from the documents related to the search term as n−1 negative example candidate documents corresponding to the search term, where n is an integer greater than 1; and determine the search term, the positive example candidate document corresponding to the search term and the n−1 negative example candidate documents corresponding to the search term as the training sample.

In some embodiments of the disclosure, the first obtaining module 510 is further configured to: obtain the search term, and obtain documents related to the search term from a document library based on an initial semantic retrieval model; obtain a third correlation degree between each of the documents related to the search term and the search term based on an initial ranking model; determine a maximum correlation degree in the third correlation degrees as a target third correlation degree; in response to the target third correlation degree being greater than a first threshold, determine the document corresponding to the target third correlation degree as a positive example candidate document corresponding to the search term; select n−1 documents from the documents related to the search term as n−1 negative example candidate documents corresponding to the search term, wherein the third correlation degree between each of the n−1 documents and the search term is less than a second threshold; and determine the search term and the positive example candidate document and the n−1 negative example candidate documents corresponding to the search term as the training sample.

With the apparatus for training a semantic retrieval network according to the embodiment of the disclosure, the training sample is input into the ranking model and the semantic retrieval model respectively, the first correlation degrees output by the ranking model and the second correlation degrees output by the semantic retrieval model are obtained. The semantic retrieval model and the ranking model are jointly trained according to the first correlation degrees and the second correlation degrees, which can not only improve the efficiency of model training, but also improve the effect after training and save training costs.

According to the embodiments of the disclosure, the disclosure also provides an electronic device, a readable storage medium and a computer program product.

Figure 6:
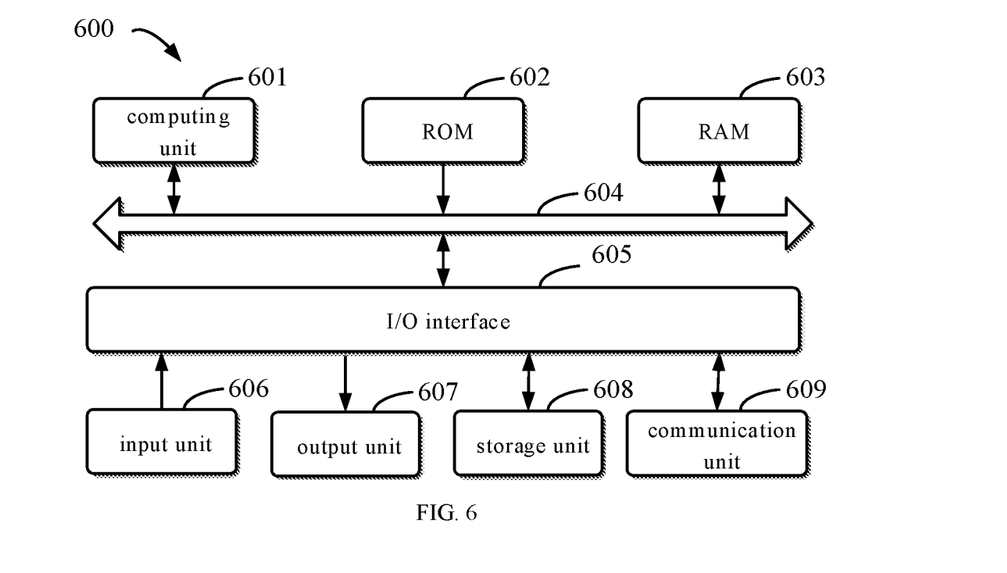
FIG. 6 is a block diagram of an example electronic device used to implement the embodiments of the disclosure.

FIG. 6 is a block diagram of an example electronic device 600 used to implement the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the device 600 includes a computing unit 601 performing various appropriate actions and processes based on computer programs stored in a read-only memory (ROM) 602 or computer programs loaded from the storage unit 608 to a random access memory (RAM) 603. In the RAM 603, various programs and data required for the operation of the device 900 are stored. The computing unit 601, the ROM 602, and the RAM 603 are connected to each other through a bus 604. An input/output (I/O) interface 605 is also connected to the bus 604.

Components in the device 600 are connected to the I/O interface 605, including: an inputting unit 606, such as a keyboard, a mouse; an outputting unit 607, such as various types of displays, speakers; a storage unit 608, such as a disk, an optical disk; and a communication unit 609, such as network cards, modems, and wireless communication transceivers. The communication unit 609 allows the device 600 to exchange information/data with other devices through a computer network such as the Internet and/or various telecommunication networks.

The computing unit 601 may be various general-purpose and/or dedicated processing components with processing and computing capabilities. Some examples of computing unit 601 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 601 executes the various methods and processes described above, such as the method for training a semantic retrieval network. For example, in some embodiments, the method may be implemented as a computer software program, which is tangibly contained in a machine-readable medium, such as the storage unit 608. In some embodiments, part or all of the computer program may be loaded and/or installed on the device 600 via the ROM 602 and/or the communication unit 609. When the computer program is loaded on the RAM 603 and executed by the computing unit 601, one or more steps of the method described above may be executed. Alternatively, in other embodiments, the computing unit 601 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclo sure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other. The server can be a cloud server, a server of a distributed system, or a server combined with a block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for training a semantic retrieval network, wherein the semantic retrieval network comprises a semantic retrieval model and a ranking model, and the method comprises:
    obtaining a training sample comprising a search term and n candidate documents corresponding to the search term, where n is an integer greater than 1;
    inputting the training sample into the ranking model, to obtain n first correlation degrees output by the ranking model, wherein each first correlation degree represents a correlation between a candidate document and the search term;
    inputting the training sample into the semantic retrieval model, to obtain n second correlation degrees output by the semantic retrieval model, wherein each second correlation degree represents a correlation between a candidate document and the search term;
    training the semantic retrieval model and the ranking model jointly based on the n first correlation degrees and the n second correlation degrees; and
    finding information related to an input search term by using the semantic retrieval network;
    wherein the n candidate documents comprise a positive example candidate document and n−1 negative example candidate documents, and training the semantic retrieval model and the ranking model jointly based on the n first correlation degrees and the n second correlation degrees, comprises:
    calculating a first loss value of the ranking model based on the first correlation degree between the search term and the positive example candidate document, and the first correlation degree between the search term and each negative example candidate document; the first loss value is used to represent a difference between the first correlation degree and a real sample value;
    calculating a second loss value of the semantic retrieval model based on the n first correlation degrees and the n second correlation degrees; the second loss value is used to represent a difference between the n second correlation degree and the n first correlation degree;
    calculating a joint loss value based on the first loss value and the second loss value; and
    training the semantic retrieval model and the ranking model jointly according to the joint loss value.

2. The method of claim 1, wherein calculating the second loss value of the semantic retrieval model based on the n first correlation degrees and the n second correlation degrees, comprises:
    obtaining the second loss value by performing Kullback-Leibler (KL) dispersion loss calculation based on the n first correlation degrees and the n second correlation degrees.

3. The method of claim 1, wherein obtaining the training sample, comprises:
    obtaining the search term and the positive example candidate document labeled by the search term;
    obtaining documents related to the search term from a document library based on an initial semantic retrieval model;
    selecting n−1 documents randomly from the documents related to the search term as n−1 negative example candidate documents corresponding to the search term; and
    determining the search term, the positive example candidate document corresponding to the search term and the n-1 negative example candidate documents corresponding to the search term as the training sample.

4. The method of claim 1, wherein obtaining the training sample, comprises:
obtaining the search term, and obtaining documents related to the search term from a document library based on an initial semantic retrieval model;
obtaining a third correlation degree between each of the documents related to the search term and the search term based on an initial ranking model;
determining a maximum correlation degree in the third correlation degrees as a target third correlation degree;
in response to the target third correlation degree being greater than a first threshold, determining the document corresponding to the target third correlation degree as the positive example candidate document corresponding to the search term;
selecting n-1 documents from the documents related to the search term as n-1 negative example candidate documents corresponding to the search term, wherein the third correlation degree between each of the n-1 documents and the search term is less than a second threshold; and
determining the search term and the positive example candidate document and the n-1 negative example candidate documents corresponding to the search term as the training sample.

5. An electronic device, comprising:
at least one processor; and
a memory communicatively coupled to the at least one processor; wherein,
the memory stores instructions executable by the at least one processor, when the instructions are executed by the at least one processor, the at least one processor is caused to perform the following:
obtaining a training sample comprising a search term and n candidate documents corresponding to the search term, where n is an integer greater than 1;
inputting the training sample into a ranking model of a semantic retrieval network, to obtain n first correlation degrees output by the ranking model, wherein each first correlation degree represents a correlation between a candidate document and the search term;
inputting the training sample into a semantic retrieval model of the semantic retrieval network, to obtain n second correlation degrees output by the semantic retrieval model, wherein each second correlation degree represents a correlation between a candidate document and the search term;
training the semantic retrieval model and the ranking model jointly based on the n first correlation degrees and the n second correlation degrees; and
finding information related to an input search term by using the semantic retrieval network;
wherein the n candidate documents comprise a positive example candidate document and n-1 negative example candidate documents, and training the semantic retrieval model and the ranking model jointly based on the n first correlation degrees and the n second correlation degrees, comprises:
calculating a first loss value of the ranking model based on the first correlation degree between the search term and the positive example candidate document, and the first correlation degree between the search term and each negative example candidate document; the first loss value is used to represent a difference between the first correlation degree and a real sample value;
calculating a second loss value of the semantic retrieval model based on the n first correlation degrees and the n second correlation degrees; the second loss value is used to represent a difference between the n second correlation degree and the n first correlation degree;
calculating a joint loss value based on the first loss value and the second loss value; and
training the semantic retrieval model and the ranking model jointly according to the joint loss value.

6. The device of claim 5, wherein calculating the second loss value of the semantic retrieval model based on the n first correlation degrees and the n second correlation degrees, comprises:
obtaining the second loss value by performing Kullback-Leibler (KL) dispersion loss calculation based on the n first correlation degrees and the n second correlation degrees.

7. The device of claim 5, wherein obtaining the training sample, comprises:
obtaining the search term and the positive example candidate document labeled by the search term;
obtaining documents related to the search term from a document library based on an initial semantic retrieval model;
selecting n-1 documents randomly from the documents related to the search term as n-1 negative example candidate documents corresponding to the search term; and
determining the search term, the positive example candidate document corresponding to the search term and the n-1 negative example candidate documents corresponding to the search term as the training sample.

8. The device of claim 5, wherein obtaining the training sample, comprises:
obtaining the search term, and obtaining documents related to the search term from a document library based on an initial semantic retrieval model;
obtaining a third correlation degree between each of the documents related to the search term and the search term based on an initial ranking model;
determining a maximum correlation degree in the third correlation degrees as a target third correlation degree;
in response to the target third correlation degree being greater than a first threshold, determining the document corresponding to the target third correlation degree as the positive example candidate document corresponding to the search term;
selecting n-1 documents from the documents related to the search term as n-1 negative example candidate documents corresponding to the search term, wherein the third correlation degree between each of the n-1 documents and the search term is less than a second threshold; and
determining the search term and the positive example candidate document and the n-1 negative example candidate documents corresponding to the search term as the training sample.

9. A non-transitory computer-readable storage medium storing computer instructions, wherein the instructions are configured to cause a computer to perform the following:
obtaining a training sample comprising a search term and n candidate documents corresponding to the search term, where n is an integer greater than 1;
inputting the training sample into a ranking model of a semantic retrieval network, to obtain n first correlation degrees output by the ranking model, wherein each first correlation degree represents a correlation between a candidate document and the search term;

inputting the training sample into a semantic retrieval model of the semantic retrieval network, to obtain n second correlation degrees output by the semantic retrieval model, wherein each second correlation degree represents a correlation between a candidate document and the search term;

training the semantic retrieval model and the ranking model jointly based on the n first correlation degrees and the n second correlation degrees, and finding information related to an input search term by using the semantic retrieval network;

wherein the n candidate documents comprise a positive example candidate document and n−1 negative example candidate documents, and training the semantic retrieval model and the ranking model jointly based on the n first correlation degrees and the n second correlation degrees, comprises:

calculating a first loss value of the ranking model based on the first correlation degree between the search term and the positive example candidate document, and the first correlation degree between the search term and each negative example candidate document; the first loss value is used to represent a difference between the first correlation degree and a real sample value;

calculating a second loss value of the semantic retrieval model based on the n first correlation degrees and the n second correlation degrees; the second loss value is used to represent a difference between the n second correlation degree and the n first correlation degree;

calculating a joint loss value based on the first loss value and the second loss value; and training the semantic retrieval model and the ranking model jointly according to the joint loss value.

10. The storage medium of claim 9, wherein calculating the second loss value of the semantic retrieval model based on the n first correlation degrees and the n second correlation degrees, comprises:

obtaining the second loss value by performing Kullback-Leibler (KL) dispersion loss calculation based on the n first correlation degrees and the n second correlation degrees.

11. The storage medium of claim 9, wherein obtaining the training sample, comprises:

obtaining the search term and the positive example candidate document labeled by the search term;

obtaining documents related to the search term from a document library based on an initial semantic retrieval model;

selecting n−1 documents randomly from the documents related to the search term as n−1 negative example candidate documents corresponding to the search term; and determining the search term, the positive example candidate document corresponding to the search term and the n−1 negative example candidate documents corresponding to the search term as the training sample.

12. The storage medium of claim 9, wherein obtaining the training sample, comprises:

obtaining the search term, and obtaining documents related to the search term from a document library based on an initial semantic retrieval model;

obtaining a third correlation degree between each of the documents related to the search term and the search term based on an initial ranking model;

determining a maximum correlation degree in the third correlation degrees as a target third correlation degree;

in response to the target third correlation degree being greater than a first threshold, determining the document corresponding to the target third correlation degree as the positive example candidate document corresponding to the search term;

selecting n−1 documents from the documents related to the search term as n−1 negative example candidate documents corresponding to the search term, wherein the third correlation degree between each of the n−1 documents and the search term is less than a second threshold; and determining the search term and the positive example candidate document and the n−1 negative example candidate documents corresponding to the search term as the training sample.

* * * * *